United States Patent
Ozawa et al.

(10) Patent No.: US 11,859,095 B2
(45) Date of Patent: *Jan. 2, 2024

(54) INK SET AND RECORDING HEAD TESTING METHOD

(71) Applicant: KYOCERA Document Solutions Inc., Osaka (JP)

(72) Inventors: Noriaki Ozawa, Osaka (JP); Yasuko Takaori, Osaka (JP); Toyotsune Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 154 days.

This patent is subject to a terminal disclaimer.

(21) Appl. No.: 17/553,123

(22) Filed: Dec. 16, 2021

(65) Prior Publication Data
US 2022/0195230 A1  Jun. 23, 2022

(30) Foreign Application Priority Data

Dec. 23, 2020 (JP) ................................. 2020-213640

(51) Int. Cl.
| | | |
|---|---|---|
| *C09D 11/54* | (2014.01) | |
| *B41M 5/00* | (2006.01) | |
| *C09D 11/107* | (2014.01) | |
| *C09D 11/322* | (2014.01) | |
| *C09D 11/38* | (2014.01) | |
| *C09D 11/40* | (2014.01) | |
| *B41J 2/21* | (2006.01) | |
| *B41J 2/01* | (2006.01) | |

(52) U.S. Cl.
CPC ................. *C09D 11/54* (2013.01); *B41J 2/01* (2013.01); *B41J 2/2107* (2013.01); *B41M 5/0023* (2013.01); *C09D 11/107* (2013.01); *C09D 11/322* (2013.01); *C09D 11/38* (2013.01); *C09D 11/40* (2013.01); *B41J 2/211* (2013.01); *B41J 2/2114* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 5,917,512 A | * | 6/1999 | Weber .................. | B41J 2/16552 347/28 |
| 2002/0163556 A1 | * | 11/2002 | Premnath ............. | B41J 2/16552 347/35 |
| 2007/0054981 A1 | * | 3/2007 | Yanagi .................. | C09D 11/40 523/160 |
| 2018/0056691 A1 | * | 3/2018 | Arai ...................... | B41M 5/0023 |

FOREIGN PATENT DOCUMENTS

JP  2010-227729 A  10/2010

* cited by examiner

*Primary Examiner* — Manish S Shah
(74) *Attorney, Agent, or Firm* — Studebaker & Brackett PC

(57) ABSTRACT

An ink set includes an inkjet ink and a recording head filling liquid. The inkjet ink includes a pigment, a pigment coating resin, a first alkali metal ion, and water. The recording head filling liquid includes polyethylene glycol, a second alkali metal ion, a surfactant, and water. The polyethylene glycol has a mass average molecular weight of at least 180 and no greater than 800. A content ratio of the surfactant in the recording head filling liquid is greater than 0.00% by mass and no greater than 0.10% by mass. The first and second alkali metal ions each contain at least one of $Li^+$, $Na^+$, and $K^+$.

4 Claims, No Drawings

INK SET AND RECORDING HEAD TESTING METHOD

INCORPORATION BY REFERENCE

The present application claims priority under 35 U.S.C. § 119 to Japanese Patent Application No. 2020-213640, filed on Dec. 23, 2020. The contents of this application are incorporated herein by reference in their entirety.

BACKGROUND

The present disclosure relates to an ink set and a recording head testing method.

An inkjet recording device includes a recording head that discharges inkjet ink. The recording head is a precision machine that requires extremely high precision. As such, it is common for a recording head manufacturer to fully test the discharge performance and the like of the recording head after production and before shipment.

In testing the discharge performance of the recording head, the recording head is actually filled with an inkjet ink and a discharge test is performed. Some of the inkjet ink inevitably remains in the ink flow channel of the recording head after inspection. Because the ink flow channel of the recording head is very minute, it is difficult to completely remove the residual inkjet ink from the ink flow channel even when the recording head is washed. When the recording head is shipped with inkjet ink remaining in the ink flow channel, solvent may evaporate from the inkjet ink during transportation and storage, and solid content (particularly a pigment component) of the inkjet ink may agglomerate to cause an aggregate. The aggregate described above causes discharge failure in the recording head after shipment.

Therefore, the recording head manufacturer may ship the recording head in a state in which the inkjet head is filled with a solution (may be referred to in the following as a recording head filling liquid) which does not contain a pigment component. The recording head filling liquid enters the ink flow channel of the recording head and dilutes the inkjet ink remaining in the ink flow channel. Through the above, it becomes difficult for the solid content to agglomerate in the inkjet ink remaining in the ink flow channel. Such a recording head filling liquid must be easily introduced into the ink flow channel in the recording head and be capable of inhibiting the solid content of the inkjet ink from agglomerating in the recording head. For example, a recording head filling liquid containing silicone oil has been proposed as the recording head filling liquid to fill the recording head.

SUMMARY

An ink set according to an aspect of the present disclosure includes an inkjet ink and a recording head filling liquid. The inkjet ink includes a pigment, a pigment coating resin, a first alkali metal ion, and water. The recording head filling liquid includes polyethylene glycol, a second alkali metal ion, a surfactant, and water. The polyethylene glycol has a mass average molecular weight of at least 180 and no greater than 800. A content ratio of the surfactant in the recording head filling liquid is greater than 0.00% by mass and no greater than 0.10% by mass. The first and second alkali metal ions each contain at least one of $Li^+$, $Na^+$, and $K^+$. The first and second alkali metal ions are identical to each other. The recording head filling liquid has a pH of at least 7.0 and no higher than 11.5.

A recording head testing method according to an aspect of the present disclosure is a method for testing a recording head using the ink set described above, and includes testing discharge performance of the recording head and filling the recording head with a recording head filling liquid after the testing. In the testing, the discharge performance of the recording head is tested by the recording head discharging the inkjet ink.

DETAILED DESCRIPTION

The following describes embodiments of the present disclosure. Note that in the following, measurement values of volume median diameter ($D_{50}$) are values measured using a dynamic light scattering type particle size distribution analyzer ("Zetasizer Nano ZS", product of Malvern Instruments Ltd.) unless otherwise specified.

In the following, measurement values of acid value are values measured according to "Japanese Industrial Standards (JIS) K0070-1992" unless otherwise specified. Furthermore, measurement values of mass average molecular weight (Mw) are values measured using gel permeation chromatography unless otherwise specified.

In the present specification, acrylic and methacrylic may be collectively referred to as "(meth)acrylic".

First Embodiment: Ink Set

The following describes an ink set according to a first embodiment of the present disclosure. The ink set of the present disclosure includes an inkjet ink (may be referred to below simply as an "ink") and a recording head filling liquid (may be referred to below simply as a "filling liquid"). The ink contains a pigment, a pigment coating resin, a first alkali metal ion, and water. The filling liquid contains polyethylene glycol, a second alkali metal ion, a surfactant, and water. The polyethylene glycol has a mass average molecular weight of at least 180 and no greater than 800. The content ratio of the surfactant in the filling liquid is greater than 0.00% by mass and no greater than 0.10% by mass. The first and second alkali metal ions each contain at least one of $Li^+$, $Na^+$, and $K^+$. The first and second alkali metal ions are identical to each other. The filling liquid has a pH of at least 7.0 and no higher than 11.5.

In the ink set of the present disclosure, the filling liquid is used to fill a recording head in which ink remains. For example, when the recording head is temporarily unused for some reason after the recording head has discharged the ink, the filling liquid is used to fill the recording head. Specifically, the filling liquid is used to fill the recording head during shipment of the recording head, long-term storage of the recording head, or transportation of the recording head. The ink set of the present disclosure is suitable as an ink set used in a recording head testing method according to a second embodiment.

By including the configuration described above, the ink set of the present disclosure facilitates introduction of the filling liquid into the ink flow channel in the recording head and can effectively inhibit the pigment component (pigment and pigment coating resin) in the ink from agglomerating in the recording head. The reasons for this are surmised to be as follows. The ink contains a first alkali metal ion including at least one of $Li^+$, $Na^+$, and $K^+$. The first alkali metal ion included in the ink is a monovalent cation and has high ionic strength. Therefore, the first alkali metal ion functions as an excellent counter ion for the pigment coating resin and contributes to improved dispersibility of the pigment component. In this way, the first alkali metal ion is an essential component to stably disperse the pigment component in the ink.

Here, when the filling liquid does not contain an alkali metal ion, or when an alkali metal ion contained in the filling liquid differs from an alkali metal ion contained in the ink, the dispersibility of the pigment component becomes unstable when the ink and filling liquid are mixed together. By contrast, the filling liquid contains the second alkali metal ion. The first and second alkali metal ions are identical to each other. As such, the ink set of the present disclosure can inhibit the dispersibility of the pigment component from becoming unstable when the ink and the filling liquid are mixed together. Additionally, the pigment component tends to be stably dispersed in neutral to slightly alkaline solutions. Because the filling liquid is neutral to slightly alkaline, the filling liquid can maintain the dispersibility of the pigment component when mixed with the ink. Additionally, the filling liquid contains a surfactant. The surfactant improves the dispersibility of the pigment component and facilitates the introduction of the filling liquid into the ink flow channel in the recording head. However, a large amount of surfactant can reduce the dispersibility of the pigment component. As such, the content ratio of the surfactant in the filling liquid is very small.

The ink flow channel in the recording head is connected to outside air through an opening (e.g., a nozzle orifice). As such, in the filling liquid in the recording head, water gradually evaporates and other components are concentrated. From the above, the filling liquid must maintain the dissolved state of the surfactant even when water has evaporated. By contrast, the filling liquid contains polyethylene glycol. Polyethylene glycol is a component that easily dissolves surfactants (particularly highly hydrophobic surfactants) and does not volatilize easily. By containing polyethylene glycol, the filling liquid can maintain the dissolved state of the surfactant even when water evaporates after the filling liquid has been filled into the recording head. From the above, the ink set of the present disclosure can effectively inhibit the pigment component in the ink from agglomerating in the recording head. Additionally, the polyethylene glycol contained in the filling liquid has a relatively low molecular weight with a mass average molecular weight of at least 180 and no greater than 800, and has a low viscosity. From the above, the ink set of the present disclosure facilitates the introduction of the filling liquid into the ink flow channel in the recording head.

The following describes the ink set of the present disclosure in further detail. Note that each component in the following description may be used as one type thereof independently, or may be used as a combination of two or more types thereof.

[Ink]

The ink contains a pigment, a pigment coating resin, a first alkali metal ion, and water.

The pigment in the ink forms pigment particles together with a pigment coating resin, for example. The pigment particles are dispersed in a solvent. From the viewpoint of improving the color density, hue, or stability of the ink, the $D_{50}$ of the pigment particles is preferably at least 30 nm and no greater than 200 nm, and more preferably at least 70 nm and no greater than 130 nm.

(Pigment)

Examples of the pigment included in the ink include a yellow pigment, an orange pigment, a red pigment, a blue pigment, a violet pigment, and a black pigment. Examples of the yellow pigment include C.I. Pigment Yellow (74, 93, 95, 109, 110, 120, 128, 138, 139, 151, 154, 155, 173, 180, 185, or 193). Examples of the orange pigment include C.I. Pigment Orange (34, 36, 43, 61, 63, or 71). Examples of the red pigment include C.I. Pigment Red (122 or 202). Examples of the blue pigment include C.I. Pigment Blue (15, more specifically 15:3). Examples of the violet pigment include C.I. Pigment Violet (19, 23, or 33). Examples of the black pigment include C.I. Pigment Black (7).

The content ratio of the pigment in the ink is preferably at least 1.0% by mass and no greater than 12.0% by mass, and more preferably at least 4.0% by mass and no greater than 8.0% by mass. By setting the content ratio of the pigment to at least 1.0% by mass, the image density of an image formed by the ink can be set to a desired value. Furthermore, by setting the content ratio of the pigment to no greater than 12.0% by mass, the fluidity of the ink can be improved.

(Pigment Coating Resin)

The pigment coating resin is a resin that is soluble in the ink. A portion of the pigment coating resin, for example, is present on the surfaces of the pigment particles to improve the dispersibility of the pigment particles. A portion of the pigment coating resin, for example, is present as dissolved in the ink.

Examples of the pigment coating resin include a copolymer of at least one monomer among (meth)acrylic acid alkyl ester, styrene, and vinylnaphthalene and at least one monomer among (meth)acrylic acid and maleic acid.

The pigment coating resin is preferably a resin with a repeating unit derived from (meth)acrylic acid (a (meth)acrylic acid unit), a repeating unit derived from (meth)acrylic acid alkyl ester (a (meth)acrylic acid alkyl ester unit), and a styrene unit. In this case, the ratio of the (meth)acrylic acid unit to all repeating units in the pigment coating resin is preferably at least 20% by mass and no greater than 60% by mass. The ratio of the (meth)acrylic acid alkyl ester unit to all repeating units in the pigment coating resin is preferably at least 30% by mass and no greater than 65% by mass. The ratio of the styrene unit to all repeating units included in the pigment coating resin is preferably at least 5% by mass and no greater than 25% by mass. The pigment coating resin is more preferably a resin with a repeating unit derived from methacrylic acid, a repeating unit derived from methyl methacrylate, a repeating unit derived from butyl acrylate, and a styrene unit.

The content ratio of the pigment coating resin in the ink is preferably at least 0.5% by mass and no greater than 8.0% by mass, and more preferably at least 1.5% by mass and no greater than 4.0% by mass. By setting the content ratio of the pigment coating resin to at least 0.5% by mass, the dispersibility of the pigment component can be improved. By setting the content ratio of the pigment coating resin to no greater than 8.0% by mass, the ink can be inhibited from causing nozzle clogging.

The pigment coating resin has an acid value of at least 50 mgKOH/g and no greater than 150 mgKOH/g, for example. By setting the acid value of the pigment coating resin to at least 50 mgKOH/g and no greater than 150 mgKOH/g, the preservation stability of the ink can be improved while further improving the dispersibility of the pigment component.

The acid value of the pigment coating resin can be adjusted by changing the amount of monomer used in synthesizing the pigment coating resin. For example, by using a monomer (more specifically acrylic acid, methacrylic acid, or the like) with an acidic functional group (e.g., a carboxy group) in synthesizing the pigment coating resin, the acid value of the pigment coating resin can be increased.

The pigment coating resin has an Mw of at least 10,000 and no greater than 50,000, for example. By setting the Mw of the pigment coating resin to at least 10,000 and no greater than 50,000, the image density of an image formed by the ink can be set to a desired value while inhibiting an increase in the viscosity of the ink.

The Mw of the pigment coating resin can be adjusted by changing the polymerization conditions (more specifically the amount of polymerization initiator used, the polymerization temperature, the polymerization time, and the like) of the pigment coating resin.

In the polymerization of the pigment coating resin, the amount of polymerization initiator used is preferably at least 0.001 mole and no greater than 5 moles to 1 mole of the monomer mixture, and more preferably at least 0.01 mole and no greater than 2 moles. In the polymerization of the pigment coating resin, for example, the polymerization temperature can be set to at least 50° C. and no higher than 70° C., and the polymerization time can be set to at least 10 hours and no longer than 24 hours. Note that the polymerized pigment coating resin may be used as a raw material of the ink, or may be used as a raw material of the ink after being neutralized with an equal amount of a basic compound. The basic compound is preferably a hydroxide of the first alkali metal ion.

(First Alkali Metal Ion)

The first alkali metal ion functions as a counter ion of the pigment coating resin. The first alkali metal ion includes at least one of $Li^+$, $Na^+$, and $K^+$. The first alkali metal ion preferably includes only one of $Li^+$, $Na^+$, and $K^+$.

The first alkali metal ion is added to the ink as a salt (particularly a hydroxide), for example. That is, the ink contains lithium hydroxide, sodium hydroxide, or potassium hydroxide, for example.

The amount of the first alkali metal ion in the ink is an amount capable of neutralizing the pigment coating resin in equal amounts (more specifically at least 90% by mass and no greater than 120% by mass to an amount capable of neutralizing the pigment coating resin in equal amounts), for example.

(Water)

Water is the main solvent of the ink. The content ratio of water in the ink is at least 30.0% by mass and no greater than 60.0% by mass, for example.

(Water-Soluble Organic Solvent)

The ink preferably further contains a water-soluble organic solvent. Examples of the water-soluble organic solvent in the ink include a glycol compound, a glycol ether compound, a lactam compound, a nitrogen-containing compound, an acetate compound, thiodiglycol, glycerin, and dimethyl sulfoxide.

Examples of the glycol compound include ethylene glycol, 1,3-propanediol, propylene glycol, 1,5-pentanediol, 1,2-octanediol, 1,8-octanediol, 3-methyl-1,5-pentanediol, diethylene glycol, triethylene glycol, and tetraethylene glycol.

Examples of the glycol ether compound include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether.

Examples of the lactam compound include 2-pyrrolidone and N-methyl-2-pyrrolidone.

Examples of the nitrogen-containing compound include 1,3-dimethylimidazolidinone, formamide, and dimethyl formamide.

Examples of the acetate compound include diethylene glycol monoethyl ether acetate.

The water-soluble organic solvent in the ink is preferably triethylene glycol monobutyl ether, 2-pyrrolidone, or glycerin.

The content ratio of the water-soluble organic solvent in the ink is preferably at least 10.0% by mass and no greater than 45.0% by mass, and more preferably at least 25.0% by mass and no greater than 35.0% by mass. By setting the content ratio of the water-soluble organic solvent to at least 10.0% by mass and no greater than 45.0% by mass, the discharge stability of the ink can be improved.

(Surfactant)

The ink preferably further contains a surfactant. The surfactant improves the compatibility and dispersion stability of each component included in the ink. The surfactant also improves the permeability (wettability) of the ink to a recording medium. The surfactant in the ink is preferably a non-ionic surfactant.

Examples of the non-ionic surfactant in the ink include an acetylene glycol surfactant (surfactant including an acetylene glycol compound), a silicone surfactant (surfactant including a silicone compound), and a fluorine surfactant (surfactant including a fluororesin or a fluorine-containing compound). Examples of the acetylene glycol surfactant include an ethylene oxide adduct of acetylene glycol and a propylene oxide adduct of acetylene glycol.

When the ink contains a non-ionic surfactant, the content ratio of the non-ionic surfactant in the ink is preferably at least 0.1% by mass and no greater than 2.0% by mass, and more preferably at least 0.2% by mass and no greater than 0.6% by mass.

(Additives)

The ink may further contain known additives (e.g., a solution stabilizer, an anti-drying agent, an antioxidant, a viscosity modifier, a pH adjuster, and an antifungal agent) as necessary.

(Ink Production Method)

The ink can be produced, for example, by mixing water, a pigment dispersion, and additional components (e.g., water-soluble organic solvent and non-ionic surfactant) as necessary. The pigment dispersion contains the pigment, the pigment coating resin, and the first alkali metal ion. The pigment coating resin is prepared by neutralizing an equal amount of an alkali-soluble resin with a salt (e.g., hydroxide) including the first alkali metal ion, for example. The pigment dispersion can be prepared by adding the pigment to an aqueous solution containing the pigment coating resin and then performing dispersion processing. Examples of an apparatus used in the dispersion processing include a bead mill. After the dispersion processing in the production of the ink, foreign objects and coarse particles may be removed by a filter (e.g., a filter with a pore size of no larger than 5 µm).

[Filling Liquid]

The filling liquid contains polyethylene glycol, a second alkali metal ion, a surfactant, and water.

The pH of the filling liquid is at least 7.0 and no higher than 11.5, and preferably at least 7.5 and no higher than 9.0. By setting the pH of the filling liquid to at least 7.0 and no higher than 11.5, the ink set of the present disclosure can effectively inhibit the pigment component in the ink from agglomerating in the recording head.

The contact angle of the filling liquid to a stainless-steel plate is preferably no larger than 60°. Here, the ink flow channels of recording heads are often composed of stainless-steel material. By setting the contact angle of the filling liquid to the stainless-steel plate to no larger than 60°, the filling liquid is more easily introduced into the ink flow channel in the recording head.

The static surface tension of the filling liquid at 20° C. is preferably at least 20 mN/m and no greater than 30 mN/m. By setting the static surface tension of the filling liquid to at least 20 mN/m and no greater than 30 mN/m, the filling liquid is more easily introduced into the ink flow channel in the recording head.

(Polyethylene Glycol)

The polyethylene glycol has a mass average molecular weight (Mw) of at least 180 and no greater than 800, preferably at least 250 and no greater than 500. By setting the mass average molecular weight of the polyethylene glycol to at least 180, the polyethylene glycol can be inhibited from volatilizing in the recording head after the filling liquid is filled into the recording head. By setting the mass average molecular weight of the polyethylene glycol to no greater than 800, the viscosity of the filling liquid can be suitably reduced. As a result, the filling liquid is easily introduced into the ink flow channel in the recording head.

The content ratio of the polyethylene glycol in the filling liquid is preferably at least 3.0% by mass and no greater than 60.0% by mass, and more preferably at least 15.0% by mass and no greater than 60.0% by mass. By setting the content ratio of the polyethylene glycol in the filling liquid to at least 3.0% by mass, the pigment component in the ink can be more effectively inhibited from agglomerating in the recording head. By setting the content ratio of the polyethylene glycol in the filling liquid to no greater than 60.0% by mass, the viscosity of the filling liquid can be suitably reduced. As a result, the filling liquid is more easily introduced into the ink flow channel in the recording head.

(Second Alkali Metal Ion)

The second alkali metal ion includes at least one of $Li^+$, $Na^+$, and $K^+$. The second alkali metal ion is the same as the first alkali metal ion contained in the ink. The second alkali metal ion preferably includes only one of $Li^+$, $Na^+$, and $K^+$.

The second alkali metal ion is added to the filling liquid as a salt (e.g., a hydroxide), for example. That is, the filling liquid contains lithium hydroxide, sodium hydroxide, or potassium hydroxide, for example. The second alkali metal ion imparts a weak alkalinity to the filling liquid.

(Surfactant)

The surfactant contained in the filling liquid is preferably a non-ionic surfactant. Examples of the non-ionic surfactant contained in the filling liquid include the same surfactants given as examples of the non-ionic surfactant in the ink.

The content ratio of the surfactant in the filling liquid is more than 0.00% by mass and no greater than 0.10% by mass, preferably at least 0.01% by mass and no greater than 0.06% by mass. By setting the content ratio of the surfactant in the filling liquid to more than 0.00% by mass, the filling liquid is easily introduced into the ink flow channel in the recording head and can effectively inhibit the pigment component in the ink from agglomerating in the recording head. By setting the content ratio of the surfactant in the filling liquid to no greater than 0.10% by mass, the filling liquid can effectively inhibit the pigment component in the ink from agglomerating in the recording head.

(Water)

Water is the main solvent of the filling liquid. The content ratio of water in the filling liquid is at least 30.0% by mass and no greater than 60.0% by mass, for example.

(Water-Soluble Organic Solvent)

The filling liquid preferably further contains a water-soluble organic solvent. Due to the filling liquid containing a water-soluble organic solvent, the filling liquid is easily discharged from the recording head. Through the above, when it becomes necessary to eject the filling liquid from the recording head filled with the filling liquid, the filling liquid can be easily ejected by discharging from the recording head. Examples of the water-soluble organic solvent in the filling liquid include the same water-soluble organic solvents given as examples of the water-soluble organic solvent in the ink. The water-soluble organic solvent in the filling liquid is preferably glycerin or propylene glycol.

The content ratio of the water-soluble organic solvent in the filling liquid is preferably at least 1.0% by mass and no greater than 30.0% by mass, and more preferably at least 10.0% by mass and no greater than 20.0% by mass. By setting the content ratio of the water-soluble organic solvent in the filling liquid to at least 1.0% by mass and no greater than 30.0% by mass, the filling liquid is more easily discharged from the recording head.

(Additives)

The filling liquid may further contain known additives (e.g., a solution stabilizer, an anti-drying agent, an antioxidant, a viscosity modifier, a pH adjuster, and an antifungal agent) as necessary.

(Filling Liquid Production Method)

The filling liquid can be produced by, for example, mixing the polyethylene glycol, the surfactant, and water and then adjusting the pH by adding a salt including the second alkali metal ion.

Second Embodiment: Recording Head Testing Method

The following describes a recording head testing method according to a second embodiment of the present disclosure. The recording head testing method of the present disclosure is a method by which a recording head is tested using the ink set according to the first embodiment, and includes a testing process of testing the discharge performance of the recording head and a filling process of filling the recording head with the filling liquid after the testing process. In the testing process, the discharge performance of the recording head is tested by the recording head discharging the ink.

The recording head testing method of the present disclosure can inhibit discharge failure from occurring in the recording head after testing because the ink set according to the first embodiment is used. The recording head testing method of the present disclosure is performed by the manufacturer of the recording head before shipping the recording head, for example. The recording head to be tested by the recording head testing method of the present disclosure is not particularly limited, and examples thereof include a piezoelectric inkjet recording head and a thermal recording head.

[Testing Process]

In the present process, the discharge performance of the recording head is tested. Specifically, in the present process, the discharge performance of the recording head is tested by the recording head discharging ink. In the recording head tested in the present process, ink remains in the ink flow channel.

In the present process, the recording head may be washed after the testing process. The method of washing the recording head is not particularly limited, and examples thereof include a method of discharging a wash fluid from the recording head after the recording head is filled with the wash fluid. Examples of the wash fluid include a wash fluid including water or a water-soluble organic solvent. In the present process, it is difficult to completely remove the ink in the ink flow channel even when the recording head is washed.

[Filling Process]

In the present process, the recording head is filled with the filling liquid. After the present process, the recording head is for example stored in preparation for shipment or transported for shipment. After the recording head has been delivered to a user, the filling liquid can be ejected from the recording head by discharging the filling liquid from the recording head.

EXAMPLE

The following describes Example of the present disclosure. However, the present disclosure is not limited to the following Example.

<Study A: Mass Average Molecular Weight of Polyethylene Glycol>

In Example, the mass average molecular weight of the polyethylene glycol used in the filling liquid was first studied. The following illustrates the preparation method of each raw material used in the production of the ink.

[Preparation of Pigment Coating Resin (R-1)]

An alkali-soluble resin with a repeating unit derived from methacrylic acid (an MAA unit), a repeating unit derived from methyl methacrylate (an MMA unit), a repeating unit derived from butyl acrylate (a BA unit), and a repeating unit derived from styrene (an ST unit) was prepared. This alkali-soluble resin had a mass average molecular weight (Mw) of 20,000 and an acid value of 100 mgKOH/g. The mass ratio of each repeating unit in this alkali-soluble resin was "MAA unit:MMA unit:BA unit:ST unit=40:15:30:15". This alkali-soluble resin was mixed with an aqueous sodium hydroxide solution containing sodium hydroxide (neutralization processing). Through the neutralization processing, the alkali-soluble resin was neutralized with an equal amount (105%, strictly speaking) of NaOH. Through the above, a pigment coating resin solution containing a pigment coating resin (R-1) and water was obtained.

The Mw of the alkali-soluble resin described above was measured using gel permeation chromatography ("HLC-8020GPC", product of Tosoh Corporation) under the following conditions. Calibration curves were prepared using F-40, F-20, F-4, F-1, A-5000, A-2500, and A-1000, which are TSKgel standard polystyrene produced by Tosoh Corporation, and n-propylbenzene.

(Measurement Conditions for Mass Average Molecular Weight)

- Columns: "TSKgel SuperMultipore HZ-H", product of Tosoh Corporation (4.6 mm I.D.×15 cm semi-micro-columns)
- Number of columns: 3
- Eluent: Tetrahydrofuran
- Flow rate: 0.35 mL/min
- Sample injection amount: 10 μL
- Measurement temperature: 40° C.
- Detector: IR detector

[Preparation of Pigment Dispersion (D-1)]

To achieve the composition shown in Table 1 below, a pigment ("RIONOL (registered Japanese trademark) Blue FG-7330", product of TOYOCOLOR CO., LTD., component: copper phthalocyanine, color index: Pigment Blue 15:3), the pigment coating resin solution described above containing the pigment coating resin (R-1), an acetylene glycol surfactant "OLFINE (registered Japanese trademark) E1010" (ethylene oxide adduct of acetylene glycol), product of Nissin Chemical Industry Co., Ltd, and ion exchange water were charged into a vessel of 0.6 L capacity. Next, the contents of the vessel were wet dispersed using a media type wet disperser ("DYNO (registered Japanese trademark)-MILL", product of Willy A. Bachofen (WAB) AG).

Note that the content ratio of "water" in Table 1 below indicates the total content ratio of ion exchange water charged to the vessel described above and water included in the pigment coating resin solution (specifically, water included in the aqueous sodium hydroxide solution used to neutralize the alkali-soluble resin and water occurring due to the neutralization reaction of the alkali-soluble resin and the sodium hydroxide).

TABLE 1

| Pigment dispersion | Content ratio [% by mass] |
|---|---|
| Water | 78.5 |
| Pigment coating resin (R-1) (NaOH neutralized) | 6.0 |
| Pigment | 15.0 |
| Acetylene glycol surfactant | 0.5 |
| Total | 100.0 |

Continuing, the contents of the vessel described above underwent dispersion processing using a wet disperser ("Nano Grain Mill", product of Asada Iron Works Co., Ltd.) and zirconia beads (0.5 mm in particle diameter) as a media. Dispersion conditions were set at a temperature of 10° C. and a peripheral speed of 8 m/sec. Through the above, a pigment dispersion (D-1) was obtained.

The volume median diameter ($D_{50}$) of the pigment particles included in the obtained pigment dispersion (D-1) were measured. In detail, the obtained pigment dispersion (D-1) was diluted 300 times with ion exchange water, and this was used as a measurement sample. The $D_{50}$ of the pigment particles in the measurement sample were measured using a dynamic light scattering type particle size distribution analyzer ("Zetasizer Nano ZS", product of Malvern Instruments Ltd.). The $D_{50}$ of the pigment particles in the measurement sample was set as the $D_{50}$ of the pigment particles included in the pigment dispersion (D-1). The pigment particles included in the pigment dispersion (D-1) had a $D_{50}$ of 100 nm.

[Preparation of Ink (I-1)]

Ion exchange water was charged into a flask equipped with a stirrer ("THREE-ONE MOTOR (registered Japanese trademark) BL-600", product of Shinto Scientific Co., Ltd.). While stirring the contents with the stirrer described above (stirring speed: 400 rpm), the pigment dispersion liquid (D-1) described above, an acetylene glycol surfactant ("SURFYNOL (registered Japanese trademark) 420", product of Nissin Chemical Industry Co., Ltd.), triethylene glycol monobutyl ether, 2-pyrrolidone, glycerin, and water were added in the stated order. The proportion of the charged amount of each raw material was as shown in Table 2 below.

TABLE 2

| Ink | Charged amount [% by mass] |
|---|---|
| Pigment dispersion (D-1) | 40.0 |
| SURFYNOL (R) 420 | 0.3 |
| Triethylene glycol monobutyl ether | 4.0 |
| 2-pyrrolidone | 5.0 |
| Glycerin | 20.0 |
| Ion exchange water | Remainder |
| Total | 100.0 |

In order to remove foreign objects and coarse particles from the obtained mixture, the mixture was filtered using a filter with a pore size of 5 μm. Through the above, an ink (I-1) was obtained.

TABLE 3

| | | Filling liquid | | | | | | |
|---|---|---|---|---|---|---|---|---|
| | | F-1 | F-2 | F-3 | F-4 | F-5 | F-6 | F-7 |
| Charged amount [parts by mass] | TEG | 30.0 | — | — | — | — | — | — |
| | PEG-200 | — | 30.0 | — | — | — | — | — |
| | PEG-300 | — | — | 30.0 | — | — | — | — |
| | PEG-400 | — | — | — | 30.0 | — | — | — |
| | PEG-600 | — | — | — | — | 30.0 | — | — |
| | PEG-1000 | — | — | — | — | — | 30.0 | — |
| | PPG-400 | — | — | — | — | — | — | 30.0 |
| | OLFINE (R) Exp 4300 | 0.04 | 0.04 | 0.04 | 0.04 | 0.04 | 0.04 | 0.04 |
| | Glycerin | 15.0 | 15.0 | 15.0 | 15.0 | 15.0 | 15.0 | 15.0 |
| | Aqueous Na hydroxide solution | Adjusted to pH 8.0 (approx. 0.03~0.04 parts by mass) | | | | | | |
| | Water | Remainder | Remainder | Remainder | Remainder | Remainder | Remainder | Remainder |
| | Total | 100.0 | 100.0 | 100.0 | 100.0 | 100.0 | 100.0 | 100.0 |

[Preparation of Filling Liquids (F-1) to (F-7)]

Filling liquids (F-1) to (F-7) were prepared by the following method. First, the polyethylene glycol (PEG), triethylene glycol (TEG), and polypropylene glycol (PPG) used to prepare the filling liquids (F-1) to (F-7) are illustrated below.

TEG: Triethylene glycol (product of Maruzen Petrochemical Co., Ltd.), molecular weight 150

PEG-200: Polyethylene glycol ("PEG-200", product of Sanyo Chemical Industries, Ltd.), mass average molecular weight 200

PEG-300: Polyethylene glycol ("PEG-300", product of Sanyo Chemical Industries, Ltd.), mass average molecular weight 300

PEG-400: Polyethylene glycol ("PEG-400", product of Sanyo Chemical Industries, Ltd.), mass average molecular weight 400

PEG-600: Polyethylene glycol ("PEG-600", product of Sanyo Chemical Industries, Ltd.), mass average molecular weight 600

PEG-1000: Polyethylene glycol ("PEG-1000", product of Sanyo Chemical Industries, Ltd.), mass average molecular weight 1000

PPG-400: Polypropylene glycol ("Polypropylene glycol 400", product of FUJIFILM Wako Pure Chemical Corporation), mass average molecular weight 400

(Preparation of Filling Liquid (F-1))

A mixed liquid was obtained by mixing 30.0 parts by mass of triethylene glycol, 0.04 parts by mass of the surfactant (S-1) ("OLFINE (registered Japanese trademark) Exp 4300", product of Nissin Chemical Industry Co., Ltd., acetylene glycol surfactant), 15.0 parts by mass of glycerin, 1N aqueous sodium hydroxide solution, and water. The additive amount of 1N aqueous sodium hydroxide solution was set to an amount bringing the pH of the mixed liquid to 8.0 (approximately 0.03 to 0.04 parts by mass). The additive amount of water was an amount bringing the total amount of the mixed liquid to 100 parts by mass. This mixed liquid was used as the filling liquid (F-1).

(Preparation of Filling Liquids (F-2) to (F-7))

The filling liquids (F-2) to (F-7) were prepared by the same method as for the preparation of the filling liquid (F-1) aside from that the additive amounts of each component were changed as shown in Table 3 below.

[Preparation of Ink Sets (IS-1) to (IS-7)]

The ink (I-1) was combined with any one of the filling liquids (F-1) to (F-7) as shown in Table 4 below. Through the above, ink sets (IS-1) to (IS-7) were prepared.

[Evaluation]

With respect to the ink sets (IS-1) to (IS-7), the following methods were used to measure whether or not ink agglomeration could be inhibited, the introductivity of the filling liquid (ease of introducing the filling liquid into the ink flow channel in the recording head), and the contact angle of the filling liquid. The measurement results are shown in Table 4 below.

(Agglomeration Inhibition)

One part by mass of the ink (ink (I-1) in Study A) and 50 parts by mass of the filling liquid (any one of the filling liquids (F-1) to (F-7) in Study A) included in the ink set to be evaluated were mixed in a beaker. Next, the beaker containing the mixed liquid was stored in a thermostatic chamber at 40° C. for one month (storage processing). After processing, the volume of the mixed liquid was reduced by approximately 50% by evaporation. After processing, the mixed liquid was analyzed for the presence or absence of aggregates with a particle diameter of 3 μm or greater using a particle shape image analyzer ("FPIA (registered Japanese trademark)-3000", product of Malvern Panalytical Ltd.). For the inhibition of ink agglomeration, "A (pass)" was defined as no occurrence of aggregates with a particle diameter of 3 μm or greater after the storage processing, and "B (fail)" was defined as occurrence of aggregates with a particle diameter of 3 μm or greater after the storage processing.

Note that when the recording head was filled with the filling liquid after the recording head was tested, the residual ink and the filling liquid were mixed inside the recording head. The mixing ratio of the residual ink and the filling liquid (amount of ink/amount of filling liquid) varied depending on the part of the recording head but was assumed to be approximately 1/50 at maximum. As such, the mixing ratio of the ink and the filling liquid was set to one part by mass of the ink to 50 parts by mass of the filling liquid. Furthermore, aggregates with a particle diameter of 3 μm or greater occurring inside the recording head may clog a filter arranged inside the recording head and cause discharge failure of the ink. As such, whether or not aggregates with a particle diameter of 3 μm or greater occurred after storage processing was used as a determination reference of whether or not ink agglomeration could be inhibited.

(Introductivity)

An unused recording head ("KJ4B-QA", product of Kyocera Corporation, total nozzle count: 2,656) was washed with pure water and thoroughly dried. Next, the recording head was filled with 25 mL of the filling liquid (any one of the filling liquids (F-1) to (F-7) in Study A) included in the ink set to be evaluated. Then, the filling liquid was ejected from the recording head by discharging the filling liquid from the recording head. This operation was performed a total of 10 times (total filling of 250 mL). Then, the recording head was refilled with the filling liquid. Nozzle check pattern printing was then performed on a glass plate using the recording head filled with the filling liquid. Through the above, a nozzle check pattern including the filling liquid was formed on the glass plate. Next, the number of discharge nozzles that could discharge the filling liquid (discharge nozzle count) was counted by reading the glass plate described above with a scanner. The ratio (%) of the discharge nozzle count to the total nozzle count (2,656) of the recording head (introduction rate) was determined by the following formula. The introductivity of the filling liquid was determined according to the following reference.

Introduction rate=100×discharge nozzle count/total nozzle count (Introductivity Determination Reference)

A (pass): introductivity 90% or higher
B (fail): introductivity less than 90%

(Contact Angle)

The filling liquid (any one of the filling liquids (F-1) to (F-7) in Study A) included in the ink set to be evaluated was dropped onto a stainless-steel plate (SUS plate 304), and the static contact angle thereof was measured. The contact angle was measured at a temperature of 23° C. using a contact angle measuring apparatus ("OCA 40", product of EKO Instruments B.V.).

As shown in Tables 1 to 4, the filling liquids (F-2) to (F-5) included in the respective ink sets (IS-2) to (IS-5) each contained polyethylene glycol with a mass average molecular weight of at least 180 and no greater than 800. The ink sets (IS-2) to (IS-5) facilitated introduction of the filling liquids into the ink flow channel in the recording head and effectively inhibited the pigment component in the ink from agglomerating in the recording head.

By contrast, the filling liquid (F-1) included in the ink set (IS-1) contained tetraethylene glycol instead of polyethylene glycol. Due to having a small mass average molecular weight, tetraetylene glycol was determined not to be capable of sufficiently maintaining the solubility of the surfactant. As a result, the ink set (IS-1) could not inhibit the pigment component in the ink from agglomerating in the recording head.

The filling liquid (F-6) included in the ink set (IS-6) contained polyethylene glycol with a mass average molecular weight of greater than 800. The filling liquid (F-6) was determined to have high viscosity due to containing polyethylene glycol with an excessively large mass average molecular weight. As a result, the filling liquid (F-6) included in the ink set (IS-6) was difficult to introduce into the ink flow channel in the recording head.

The filling liquid (F-7) included in the ink set (IS-7) contained polypropylene glycol. Polypropylene glycol was determined to reduce the dispersibility of the pigment component due to having high hydrophobicity. As a result, the ink set (IS-7) could not inhibit the pigment component in the ink from agglomerating in the recording head.

<Study B: Type and Amount of Surfactant>

Next, the type and amount of the surfactant used in the filling liquid was studied.

[Preparation of Filling Liquids (F-8) to (F-15)]

Filling liquids (F-8) to (F-15) were prepared by the following method. First, the surfactants used in the preparation of the filling liquids (F-8) to (F-15) are shown below.

S-1: Acetylene glycol surfactant ("OLFINE (registered Japanese trademark) Exp 4300", product of Nissin Chemical Industry Co., Ltd)

S-2: Acetylene glycol surfactant ("SURFYNOL (registered Japanese trademark) 104", product of Nissin Chemical Industry Co., Ltd)

S-3: Silicone surfactant ("BYK (registered Japanese trademark) 345", product of BYK Japan K.K.)

S-4: Fluorine surfactant ("SURFLON (registered Japanese trademark) S242", product of AGC Seimi Chemical Co., Ltd.)

The filling liquids (F-8) to (F-15) were prepared by the same method as for the preparation of the filling liquid (F-1) aside from that the additive amounts of each component were changed as shown in Tables 5 and 6 below.

TABLE 4

|  |  | Ink set | | | | | | |
| --- | --- | --- | --- | --- | --- | --- | --- | --- |
|  |  | IS-1 | IS-2 | IS-3 | IS-4 | IS-5 | IS-6 | IS-7 |
|  | Ink | I-1 | I-1 | I-1 | I-1 | I-1 | I-1 | I-1 |
| Filling | Type | F-1 | F-2 | F-3 | F-4 | F-5 | F-6 | F-7 |
| liquid | Compound | TEG | PEG | PEG | PEG | PEG | PEG | PPG |
|  | Mw | 150 | 200 | 300 | 400 | 600 | 1000 | 400 |
| Evaluation result | Agglomeration inhibition | B | A | A | A | A | A | B |
|  | Introductivity | A | A | A | A | A | B | A |
|  | Contact angle [°] | 60 | 60 | 60 | 60 | 60 | 64 | 60 |

TABLE 5

| | | Filling liquid | | | |
|---|---|---|---|---|---|
| | | F-8 | F-9 | F-10 | F-11 |
| Charged amount [parts by mass] | PEG-300 | 30.0 | 30.0 | 30.0 | 30.0 |
| | Surfactant (S-1) | 0.05 | — | — | — |
| | Surfactant (S-2) | — | 0.02 | — | — |
| | Surfactant (S-3) | — | — | 0.07 | — |
| | Surfactant (S-4) | — | — | — | 0.02 |
| | Propylene glycol | 17.0 | 17.0 | 17.0 | 17.0 |
| | 1N aqueous sodium hydroxide solution | Adjusted to pH 8.0 (approx. 0.03 to 0.04 parts by mass) | | | |
| | Water | Remainder | Remainder | Remainder | Remainder |
| | Total | 100.0 | 100.0 | 100.0 | 100.0 |

TABLE 6

| | | Filling liquid | | | |
|---|---|---|---|---|---|
| | | F-12 | F-13 | F-14 | F-15 |
| Charged amount [parts by mass] | PEG-300 | 30.0 | 30.0 | 30.0 | 30.0 |
| | Surfactant (S-1) | 0.08 | 0.12 | — | — |
| | Surfactant (S-2) | — | — | — | — |
| | Surfactant (S-3) | — | — | 0.09 | 0.11 |
| | Surfactant (S-4) | — | — | — | — |
| | Propylene glycol | 17.0 | 17.0 | 17.0 | 17.0 |
| | 1N aqueous sodium hydroxide solution | Adjusted to pH 8.0 (approx. 0.03 to 0.04 parts by mass) | | | |
| | Water | Remainder | Remainder | Remainder | Remainder |
| | Total | 100.0 | 100.0 | 100.0 | 100.0 |

[Preparation of Ink Sets (IS-8) to (IS-15)]

The ink (I-1) was combined with any one of the filling liquids (F-8) to (F-15) as shown in Table 7 below. Through the above, ink sets (IS-8) to (IS-15) were prepared.

[Evaluation]

With respect to the ink sets (IS-8) to (IS-15), whether or not ink agglomeration could be inhibited, the introductivity of the filling liquid, and the contact angle of the filling liquid were measured by the same method as for the measurement of the ink sets (IS-1) to (IS-7). The measurement results are shown in Table 7 below.

TABLE 7

| | | Ink set | | | | | | | |
|---|---|---|---|---|---|---|---|---|---|
| | | IS-8 | IS-9 | IS-10 | IS-11 | IS-12 | IS-13 | IS-14 | IS-15 |
| | Ink | I-1 | I-1 | I-1 | I-1 | I-1 | I-1 | I-1 | I-1 |
| Filling liquid | Type | F-8 | F-9 | F-10 | F-11 | F-12 | F-13 | F-14 | F-15 |
| | Surfactant Type | S-1 | S-2 | S-3 | S-4 | S-1 | S-1 | S-3 | S-3 |
| | Parts by mass | 0.05 | 0.02 | 0.07 | 0.02 | 0.08 | 0.12 | 0.09 | 0.11 |
| Evaluation result | Agglomeration inhibition | A | A | A | A | A | B | A | B |
| | Introductivity | A | A | A | A | A | A | A | A |
| | Contact angle [°] | 58 | 58 | 57 | 56 | 58 | 57 | 58 | 56 |

As shown in Tables 5 to 7, the filling liquids (F-8) to (F-12) and (F-14) included respectively in the ink sets (IS-8) to (IS-12) and (IS-14) contained acetylene glycol surfactant, silicone surfactant, or fluorine surfactant as surfactants. The content ratio of the surfactant in the filling liquids (F-8) to (F-12) and (F-14) was greater than 0.00% by mass and no greater than 0.10% by mass. The ink sets (IS-8) to (IS-12) and (IS-14) facilitated introduction of the respective filling liquids into the ink flow channel in the recording head and effectively inhibited the pigment component in the ink from agglomerating in the recording head.

By contrast, the filling liquids (F-13) and (F-15) included in the respective ink sets (IS-13) and (IS-15) had a surfactant content ratio of more than 0.10% by mass. Due to the filling liquids of the ink sets (IS-13) and (IS-15) containing large amounts of surfactant, it was determined that the surfactant interacted with the pigment coating resin to cause agglomeration of the pigment component. As a result, the ink sets (IS-13) and (IS-15) could not inhibit the pigment component in the ink from agglomerating in the recording head.

<Study C: Type of Alkali Metal Ion>

Next, the types of the alkali metal ion included in the ink and the filling liquid were studied.

[Preparation of Pigment Coating Resins (R-2) to (R-5)]

Pigment coating resins (R-2) to (R-5) were prepared by the same method as for the preparation of the pigment coating resin (R-1) aside from the following changes. In the preparation of pigment coating resins (R-2) to (R-5), an aqueous lithium hydroxide solution, an aqueous potassium hydroxide solution, an aqueous cesium hydroxide solution, or an aqueous magnesium hydroxide solution was used instead of an aqueous sodium hydroxide solution in the neutralization processing of the alkali-soluble resin. That is, the alkali-soluble resin was neutralized with an equal amount (105%, strictly speaking) of LiOH, KOH, CsOH, or $Mg(OH)_2$. Through the above, a pigment coating resin solution containing any one of the pigment coating resins (R-2) to (R-5) and water was obtained.

[Preparation of Pigment Dispersions (D-2) to (D-5)]

Aside from the following changes, the pigment dispersions (D-2) to (D-5) were prepared by the same method as for the preparation of the pigment dispersion (D-1). In the preparation of the pigment dispersions (D-2) to (D-5), a pigment coating resin solution containing any one of the pigment coating resins (R-2) to (R-5) described above was used to achieve the compositions shown in Table 8 below.

TABLE 8

|  |  | Pigment dispersion | | | | |
|---|---|---|---|---|---|---|
|  |  | D-1 | D-2 | D-3 | D-4 | D-5 |
| Content ratio [% by mass] | Water | 78.5 | 78.5 | 78.5 | 78.5 | 78.5 |
|  | Pigment coating resin (R-1) (NaOH neutralized) | 6.0 | — | — | — | — |
|  | Pigment coating resin (R-2) (KOH neutralized) | — | 6.0 | — | — | — |
|  | Pigment coating resin (R-3) (LiOH neutralized) | — | — | 6.0 | — | — |
|  | Pigment coating resin (R-4) (CsOH neutralized) | — | — | — | 6.0 | — |
|  | Pigment coating resin (R-5) ($Mg(OH)_2$ neutralized) | — | — | — | — | 6.0 |
|  | Pigment | 15.0 | 15.0 | 15.0 | 15.0 | 15.0 |
|  | Acetylene glycol surfactant | 0.5 | 0.5 | 0.5 | 0.5 | 0.5 |
|  | Total | 100.0 | 100.0 | 100.0 | 100.0 | 100.0 |

[Preparation of Inks (I-2) to (I-5)]

As shown in Table 9 below, the inks (I-2) to (I-5) were prepared by the same method as for the preparation of the ink (I-1) aside from the pigment dispersions (D-2) to (D-5) being used instead of the pigment dispersion (D-1).

TABLE 9

|  |  | Ink | | | | |
|---|---|---|---|---|---|---|
|  |  | I-1 | I-2 | I-3 | I-4 | I-5 |
| Charged amount [% by mass] | Pigment dispersion (D-1) | 40.0 | — | — | — | — |
|  | Pigment dispersion (D-2) | — | 40.0 | — | — | — |
|  | Pigment dispersion (D-3) | — | — | 40.0 | — | — |
|  | Pigment dispersion (D-4) | — | — | — | 40.0 | — |
|  | Pigment dispersion (D-5) | — | — | — | — | 40.0 |
|  | SURFYNOL (R) 420 | 0.3 | 0.3 | 0.3 | 0.3 | 0.3 |
|  | Triethylene glycol monobutyl ether | 4.0 | 4.0 | 4.0 | 4.0 | 4.0 |
|  | 2-pyrrolidone | 5.0 | 5.0 | 5.0 | 5.0 | 5.0 |
|  | Glycerin | 20.0 | 20.0 | 20.0 | 20.0 | 20.0 |
|  | Ion exchange water | Remainder | Remainder | Remainder | Remainder | Remainder |
|  | Total | 100.0 | 100.0 | 100.0 | 100.0 | 100.0 |

[Preparation of Filling Liquids (F-16) to (F-20)]

A mixed liquid was obtained by mixing 35.0 parts by mass of "PEG-400" described above, 0.04 parts by mass of the surfactant (S-1) ("OLFINE (registered Japanese trademark) Exp 4300", product of Nissin Chemical Industry Co., Ltd., acetylene glycol surfactant), 10.0 parts by mass of glycerin, the alkali component shown in Table 10 below, and water. The additive amount of the alkali component was set to an amount (trace amount) bringing the pH of the mixed liquid to 8.0 to 9.0. The additive amount of water was an amount bringing the total amount of the mixed liquid to 100 parts by mass. The obtained mixed liquids were set as filling liquids (F-16) to (F-20).

Note that the concentrations of the aqueous sodium hydroxide (NaOH) solution, the aqueous potassium hydroxide (KOH) solution, and the aqueous lithium hydroxide (LiOH) solution shown in Table 10 below were each 1N.

TABLE 10

|  |  | Filling liquid | | | | |
|---|---|---|---|---|---|---|
|  |  | F-16 | F-17 | F-18 | F-19 | F-20 |
| Charged amount [parts by mass] | PEG-400 | 35.0 | 35.0 | 35.0 | 35.0 | 35.0 |
|  | Surfactant (S-1) | 0.04 | 0.04 | 0.04 | 0.04 | 0.04 |
|  | Glycerin | 10.0 | 10.0 | 10.0 | 10.0 | 10.0 |
| Alkali component | Type | NaOH aqueous solution | KOH aqueous solution | LiOH aqueous solution | CsOH aqueous solution | $Mg(OH)_2$ |
|  | Amount | Trace amount (adjusted to pH 8.0 to 9.0) | | | | |
|  | Water | Remainder | Remainder | Remainder | Remainder | Remainder |
|  | Total | 100.0 | 100.0 | 100.0 | 100.0 | 100.0 |

[Preparation of Ink Sets (IS-16) to (IS-23)]

Any one of the inks (I-1) to (I-5) was combined with any one of the filling liquids (F-16) to (F-20) as shown in Table 11 below. Through the above, ink sets (IS-16) to (IS-23) were prepared. In Table 11 below, the ions (alkali metal ions) included in each ink or filling liquid are also shown.

[Evaluation]

With respect to the ink sets (IS-16) to (IS-23), whether or not ink agglomeration could be inhibited, the introductivity of the filling liquid, and the contact angle of the filling liquid were measured by the same method as for the measurement of the ink sets (IS-1) to (IS-7). The measurement results are shown in Table 11 below.

TABLE 11

|  |  | Ink set | | | | | | | |
|---|---|---|---|---|---|---|---|---|---|
|  |  | IS-16 | IS-17 | IS-18 | IS-19 | IS-20 | IS-21 | IS-22 | IS-23 |
| Ink | Type | I-1 | I-2 | I-3 | I-4 | I-5 | I-1 | I-2 | I-3 |
|  | Ion | $Na^+$ | $K^+$ | $Li^+$ | $Cs^+$ | $Mg^{2+}$ | $Na^+$ | $K^+$ | $Li^+$ |
| Filling liquid | Type | F-16 | F-17 | F-18 | F-19 | F-20 | F-17 | F-18 | F-16 |
|  | Ion | $Na^+$ | $K^+$ | $Li^+$ | $Cs^+$ | $Mg^{2+}$ | $K^+$ | $Li^+$ | $Na^+$ |
| Evaluation result | Agglomeration inhibition | A | A | A | B | B | B | B | B |
|  | Introductivity | A | A | A | A | A | A | A | A |
|  | Contact angle [°] | 58 | 57 | 58 | 58 | 59 | 57 | 58 | 58 |

As shown in Tables 8 to 11, the ink sets (IS-16) to (IS-18) contained the same respective alkali metal ions in the inks and filling liquids thereof. The alkali metal ion included at least one of $Li^+$, $Na^+$, and $K^+$. The ink sets (IS-16) to (IS-18) facilitated introduction of the filling liquids into the ink flow channel in the recording head and effectively inhibited the pigment component in the ink from agglomerating in the recording head.

By contrast, the ink sets (IS-19) and (IS-20) contained $Cs^+$ or $Mg^{2+}$ in the inks and filling liquids thereof. Due to having low ionic strength, $Cs^+$ was determined not to be capable of stably dispersing the pigment components. Due to being a divalent cation, $Mg^{2+}$ was determined to have agglomerated the pigment component. As a result, the ink sets (IS-19) and (IS-20) could not inhibit the pigment component in the ink from agglomerating in the recording head.

In the ink sets (IS-21) to (IS-23), the ink and the filling liquid contained different alkali metal ions ($Li^+$, $Na^+$ or $K^+$) from each other. When the type of alkali metal ion contained in the filling liquid differed from the type of alkali metal ion contained in the ink, it was determined that the dispersibility of the pigment component was reduced when the filling liquid and ink were mixed. As a result, the ink sets (IS-21) to (IS-23) could not inhibit the pigment component in the ink from agglomerating in the recording head.

<Study D: pH of Filling Liquid>

[Preparation of Filling Liquids (F-21) to (F-24)]

A mixed liquid was obtained by mixing 35.0 parts by mass of "PEG-400" described above, 0.04 parts by mass of the surfactant (S-1) ("OLFINE (registered Japanese trademark) Exp 4300", product of Nissin Chemical Industry Co., Ltd., acetylene glycol surfactant), 10.0 parts by mass of glycerin, 1N aqueous sodium hydroxide solution, and water. The additive amount of 1N aqueous sodium hydroxide solution was set to an amount (trace amount) bringing the pH of the mixed liquid to between 8.0 and 12.0 as shown in Table 12 below. The additive amount of water was an amount bringing the total amount of the mixed liquid to 100 parts by mass. The obtained mixed liquids were set as filling liquids (F-21) to (F-24).

TABLE 12

|  |  | Filling liquid | | | |
|---|---|---|---|---|---|
|  |  | F-21 | F-22 | F-23 | F-24 |
| Charged amount [parts by mass] | PEG-400 | 35.0 | 35.0 | 35.0 | 35.0 |
|  | Surfactant (S-1) | 0.04 | 0.04 | 0.04 | 0.04 |
|  | Glycerin | 10.0 | 10.0 | 10.0 | 10.0 |
|  | 1N NaOH aqueous solution Amount | Trace amount | Trace amount | Trace amount | Trace amount |
|  | pH | 8.0 | 10.0 | 11.0 | 12.0 |
|  | Water | Remainder | Remainder | Remainder | Remainder |
|  | Total | 100.0 | 100.0 | 100.0 | 100.0 |

[Preparation of Ink Sets (IS-24) to (IS-27)]

The ink (I-1) was combined with any one of the filling liquids (F-21) to (F-24) as shown in Table 13 below. Through the above, ink sets (IS-24) to (IS-27) were prepared.

[Evaluation]

With respect to the ink sets (IS-24) to (IS-27), whether or not ink agglomeration could be inhibited, the introductivity of the filling liquid, and the contact angle of the filling liquid were measured by the same method as for the measurement of the ink sets (IS-1) to (IS-7). The measurement results are shown in Table 13 below.

TABLE 13

|  |  | Ink set | | | |
| --- | --- | --- | --- | --- | --- |
|  |  | IS-24 | IS-25 | IS-26 | IS-27 |
|  | Ink | I-1 | I-1 | I-1 | I-1 |
| Filling liquid | Type | F-21 | F-22 | F-23 | F-24 |
|  | pH | 8.0 | 10.0 | 11.0 | 12.0 |
| Evaluation result | Agglomeration inhibition | A | A | A | B |
|  | Introductivity | A | A | A | A |
|  | Contact angle [°] | 58 | 57 | 58 | 58 |

As shown in Tables 12 and 13, the filling liquids (F-21) to (F-23) included in the respective ink sets (IS-24) to (IS-26) had a pH of at least 7.0 and no higher than 11.5. The ink sets (IS-24) to (IS-26) facilitated introduction of the filling liquids into the ink flow channel in the recording head and could effectively inhibit the pigment component in the ink from agglomerating in the recording head.

By contrast, the filling liquid (F-24) included in the ink set (IS-27) had a pH higher than 11.5. When the pH of the filling liquid was too high, it was determined that the dispersibility of the pigment component was reduced. As a result, the ink set (IS-27) could not inhibit the pigment component in the ink from agglomerating in the recording head.

<Study E: Amount of Polyethylene Glycol>

[Preparation of Filling Liquids (F-25) and (F-26)]

A mixed liquid was obtained by mixing "PEG-300" described above, 0.04 parts by mass of the surfactant (S-1) ("OLFINE (registered Japanese trademark) Exp 4300", product of Nissin Chemical Industry Co., Ltd., acetylene glycol surfactant), 10.0 parts by mass of glycerin, 1N aqueous sodium hydroxide solution, and water. The additive amount of "PEG-300" was set as shown in Table 14 below. The additive amount of 1N aqueous sodium hydroxide solution was set to an amount (trace amount) bringing the pH of the mixed liquid to 8.0. The additive amount of water was an amount bringing the total amount of the mixed liquid to 100 parts by mass. The obtained mixed liquids were set as filling liquids (F-25) and (F-26).

TABLE 14

|  |  | Filling liquid | |
| --- | --- | --- | --- |
|  |  | F-25 | F-26 |
| Charged amount [parts by mass] | PEG-300 | 5.0 | 55.0 |
|  | Surfactant (S-1) | 0.04 | 0.04 |
|  | Glycerin | 10.0 | 10.0 |
|  | 1N aqueous sodium hydroxide solution | Adjusted to pH 8.0 (approx. 0.03 to 0.04 parts by mass) | |
|  | Water | Remainder | Remainder |
|  | Total | 100.0 | 100.0 |

[Preparation of Ink Sets (IS-28) and (IS-29)]

The ink (I-1) was combined with any one of the filling liquids (F-25) and (F-26) as shown in Table 15 below. Through the above, ink sets (IS-28) and (IS-29) were prepared.

[Evaluation]

With respect to the ink sets (IS-28) and (IS-29), whether or not ink agglomeration could be inhibited, the introductivity of the filling liquid, and the contact angle of the filling liquid were measured by the same method as for the measurement of the ink sets (IS-1) to (IS-7). The measurement results are shown in Table 15 below.

TABLE 15

|  |  | Ink set | |
| --- | --- | --- | --- |
|  |  | IS-28 | IS-29 |
|  | Ink | I-1 | I-1 |
| Filling liquid | Type | F-25 | F-26 |
|  | PEG-300 content ratio [% by mass] | 5.0 | 55.0 |
| Evaluation result | Agglomeration inhibition | A | A |
|  | Introductivity | A | A |
|  | Contact angle [°] | 58 | 59 |

As shown in Tables 14 and 15, the content ratio of polyethylene glycol in the filling liquids (F-25) and (F-26) included in the respective ink sets (IS-28) and (IS-29) was at least 3.0% by mass and no greater than 60.0% by mass. The ink sets (IS-28) and (IS-29) facilitated introduction of the filling liquids into the ink flow channel in the recording head and could effectively inhibit the pigment component in the ink from agglomerating in the recording head.

What is claimed is:

1. An ink set comprising an inkjet ink and a recording head filling liquid, wherein
    the inkjet ink includes a pigment, a pigment coating resin, a first alkali metal ion, and water,
    the recording head filling liquid includes polyethylene glycol, a second alkali metal ion, a surfactant, and water,
    the polyethylene glycol has a mass average molecular weight of at least 180 and no greater than 800,
    a content ratio of the surfactant in the recording head filling liquid is greater than 0.00% by mass and no greater than 0.10% by mass,
    the first and second alkali metal ions each contain at least one of $Li^+$, $Na^+$, and $K^+$,
    the first and second alkali metal ions are identical to each other,
    the recording head filling liquid has a pH of at least 7.0 and no higher than 11.5,
    the recording head filling liquid is used to fill a recording head in which the inkjet ink remains, and
    the recording head filling liquid is mixed inside the recording head with the inkjet ink remaining in the recording head.

2. The ink set according to claim 1, wherein
    a content ratio of the polyethylene glycol in the recording head filling liquid is at least 3.0% by mass and no greater than 60.0% by mass.

3. The ink set according to claim 1, wherein
    the surfactant includes at least one of an acetylene glycol surfactant, a silicone surfactant, and a fluorine surfactant.

4. A recording head testing method for testing the recording head using the ink set according to claim 1, the recording head testing method comprising:

testing discharge performance of the recording head; and
filling the recording head with the recording head filling liquid after the testing, wherein
in the testing, the discharge performance of the recording head is tested by the recording head discharging the inkjet ink.

* * * * *